United States Patent
Li et al.

(10) Patent No.: US 8,457,403 B2
(45) Date of Patent: Jun. 4, 2013

(54) METHOD OF DETECTING AND CORRECTING DIGITAL IMAGES OF BOOKS IN THE BOOK SPINE AREA

(75) Inventors: Jia Li, Aurora, CA (US); Mikhail Brusnitsyn, North York, CA (US); Sujay Sukumaran, North York, CA (US)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 13/111,199

(22) Filed: May 19, 2011

(65) Prior Publication Data

US 2012/0294528 A1 Nov. 22, 2012

(51) Int. Cl.
*G06K 9/34* (2006.01)

(52) U.S. Cl.
USPC .......................................................... 382/176

(58) Field of Classification Search
USPC .......... 382/173, 216, 274, 286, 289; 358/449, 358/453, 461, 474, 504–505, 538; 355/25, 355/82; 399/362
See application file for complete search history.

(56) References Cited

U.S. PATENT DOCUMENTS

| | | | | |
|---|---|---|---|---|
| 5,497,236 | A * | 3/1996 | Wolff et al. | 358/296 |
| 5,585,936 | A * | 12/1996 | Eto et al. | 358/450 |
| 7,330,604 | B2 * | 2/2008 | Wu et al. | 382/289 |
| 7,418,126 | B2 | 8/2008 | Fujimoto et al. | |
| 8,306,335 | B2 * | 11/2012 | Lukac | 382/190 |
| 2008/0024845 | A1 | 1/2008 | Makino et al. | |

FOREIGN PATENT DOCUMENTS

JP 10-210224 8/1998

\* cited by examiner

*Primary Examiner* — Jose Couso

(57) ABSTRACT

An image of a scanned book is segmented using a feature image to map pixels corresponding to a page area and to create page objects and detect borders of the page. A book spine region is detected by locating a plain background area between two of the page objects, analyzing the page borders to detect their shape, and analyzing their shape to detect the book spine end points. Using the page borders, the feature image is examined to detect top-to-bottom and bottom-to-top declines in pixel values to determine the corners of a shadow distortion in the original scanned image. Squeeze and curvature distortion are also detected. A Bezier curve is used to model each of the three distortions detected on the page. The detected distortion is corrected by first defining a trapezoidal correction area. The intensity, squeeze, and curvature corrections are then applied along lines within the trapezoidal correction area.

17 Claims, 21 Drawing Sheets

FIG. 5

METHOD OF DETECTING AND CORRECTING DIGITAL IMAGES OF BOOKS IN THE BOOK SPINE AREA

CROSS-REFERENCE TO RELATED APPLICATIONS

Commonly owned U.S. patent application Ser. No. 13/075,978, filed Mar. 30, 2011 and entitled "Method of analyzing digital document images", is hereby incorporated by reference in its entirety.

BACKGROUND

The present invention relates to scanning documents and particularly to scanning books.

Scanned images of book pages often have three types of distortions generated by scanning. Depending on the book's orientation relative to the scanning direction when it lays on the scanning surface and the elevation of the book spine area above the surface, these three types of distortion appear at different levels. As shown in FIG. 1, when the book spine is above the scanning surface the scanned image usually has shadows appearing in the image close to the spine ("shadow distortion"). "Squeeze distortion" happens when the page image squeezes toward the spine and consequently the text closer to the spine becomes thin and difficult to recognize. The other type of distortion, "curvature distortion," happens for the same reason but only when a book is scanned with its spine parallel to the scanner sensor bar, referred to as the "parallel scanning case." In this case, the text close to spine also bends toward the center of the page. The abovementioned distortions not only affect the image's visual readability but also cause failures in the processing of Optical Character Recognition in the affected area. The present invention provides a method to detect the presence of the distortions and to correct distortions.

SUMMARY OF INVENTION

This present invention provides a method and apparatus to analyze a digitized or scanned document image. The present invention uses block-based processing to create a feature image indicating the spatial characteristics of the document image. Three detection algorithms are designed based on this feature image to detect the page body, the book spine, and the distortions generated by scanning.

More specifically, an image of a scanned book is segmented using a feature image to map pixels corresponding to a page area and to create page objects and to detect borders of the page. Using the page borders, the feature image is examined in columns near the left and right page borders to detect top-to-bottom and bottom-to-top declines in pixel values to determine the top-left, top-right, bottom-left, and bottom right corners of a shadow distortion in the original scanned image. A book spine region is detected by locating a plain background area between two of the page objects, analyzing the page borders to detect a shape of the borders, and analyzing the shape of the borders to detect the book spine end points. In cases where the page border lacks information necessary to locate the spine, the dominant line, if one exists, will be assumed to be the spine.

Detecting distortion includes approximating an intensity change pixel values perpendicular to the book spine and fitting the intensity values to a Bezier curve to create an intensity curve. In addition the intensity curve is transformed to a squeeze curve. Detecting distortion further includes detecting curvature by examining text in the page area and fitting points on a string of text segments to a Bezier curve to create a curvature curve. The detected distortion is corrected by first defining a trapezoidal correction area. The intensity correction, squeeze correction, and curvature correction, each defined with Bezier curves, are applied along lines within the trapezoidal correction area.

The present invention is applicable to scanners and imaging software for digital document image processing and manipulation since its components can be employed to build various enhancement and segmentation solutions.

Since scanners typically scan the whole surface of the scanning area and both dimensions and position of the scanned document on the scanner's surface may vary significantly, automatically removing the dark margins around the actual document or even extracting text-only bodies on the document is often needed in order to reduce the image size and computational complexity for further processing.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 5 illustrates the text search window for detecting the top and bottom boundary of the plain background between two pages;

DESCRIPTION OF THE PREFERRED EMBODIMENTS

Figure 1:
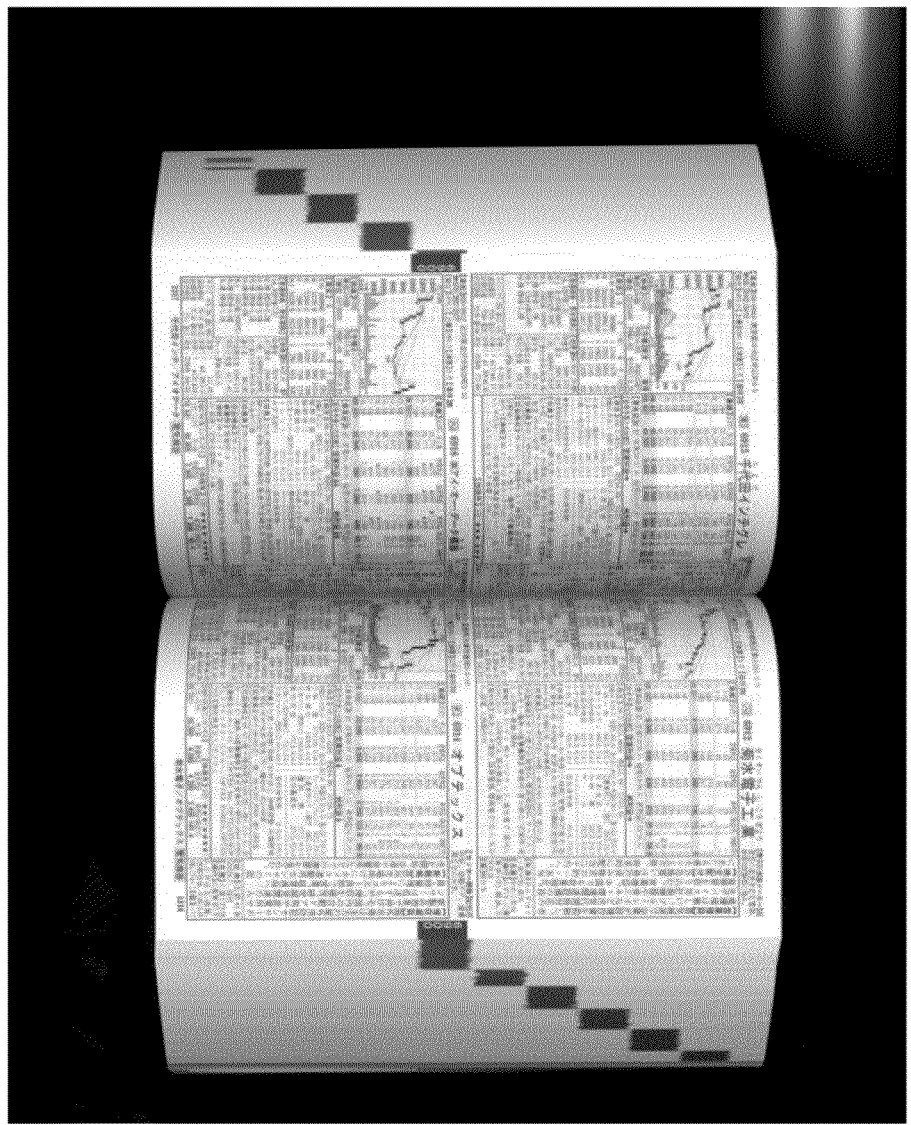
FIG. 1 illustrates a thick book that is scanned with its spine parallel to the scanner sensor bar.

In the following detailed description, reference is made to the accompanying drawings that show, by way of illustration, example embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to methods, devices, and computer-readable media for examining an image, particularly a digitized or scanned document. The image is examined to detect distortions caused during scanning and then corrected to remove or minimize the distortions.

Example embodiments extract features from a digitized or scanned image and analyze the document to detect particular characteristics. These characteristics, e.g. page area, the book spine, and distortion parameters, can then be processed to correct the image. Such correction can include intensity and warp correction. Methods consistent with the invention may be implemented in image capture devices such as flatbed scanners, as well as in software modules including printer drivers or image editing software, among other things.

Figure 3:
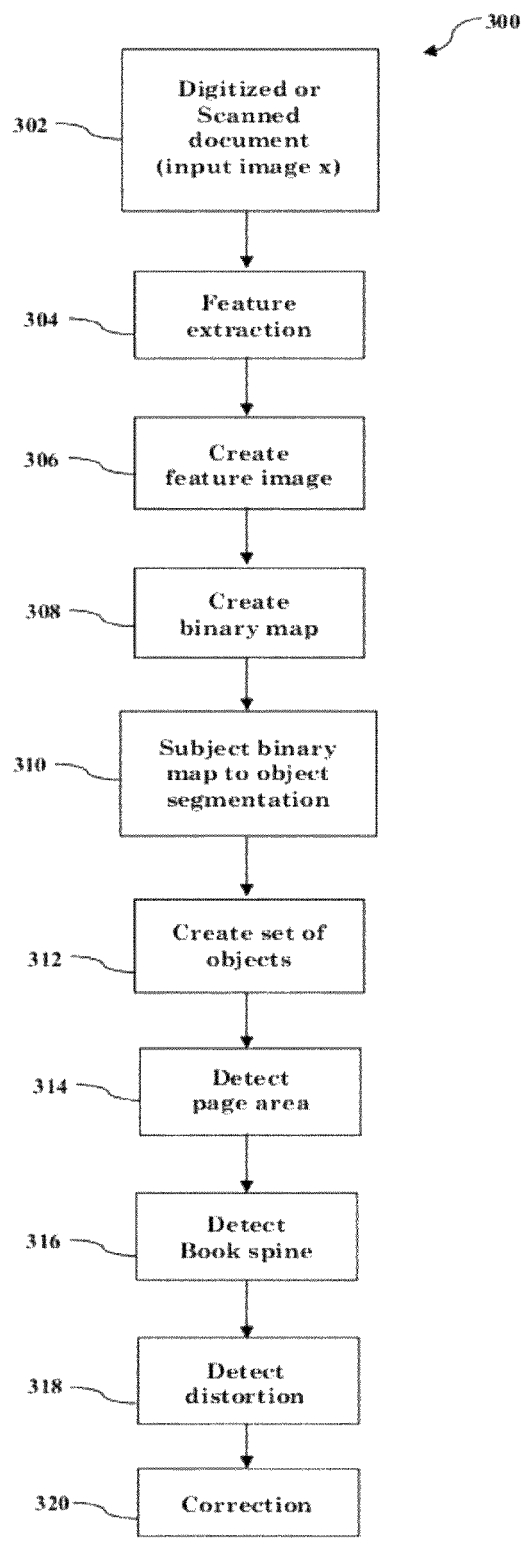
FIG. 3 is a flowchart of the general method of the present invention.

With reference now to FIG. 3, an example method 300 for feature extraction is illustrated. Generally, the example method 300 starts with a digitized or scanned image (input image x) (step 302). Each of a plurality of disjoint blocks of pixels in the input image x is transformed into a single pixel in a feature image. The feature image can then be used to analyze the original input image, e.g. a document. The major steps of method 300 are shown as general blocks in FIG. 3 but will be discussed in detail in the following description.

The example method 300 and variations thereof disclosed herein can be implemented using non-transitory computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store program code in the form of computer-executable instructions or data structures and that can be accessed by a processor of a general purpose or special purpose computer. Combinations of the above should also be included within the scope of computer-readable media.

Computer-executable instructions comprise, for example, instructions and data that cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing devices such as digital cameras (an example of which includes, but is not limited to, the Epson R-D1 digital camera manufactured by Seiko Epson Corporation headquartered in Owa, Suwa, Nagano, Japan), digital camcorders, projectors, printers, scanners, copiers, portable photo viewers (examples of which include, but are not limited to, the Epson P-3000 or P-5000 portable photo viewers manufactured by Seiko Epson Corporation), or portable movie players, or some combination thereof, such as a printer/scanner/copier combination (examples of which include, but are not limited to, the Epson Stylus Photo RX580, RX595, or RX680, the Epson Stylus CX4400, CX7400, CX8400, or CX9400Fax, and the Epson AcuLaser® CX11NF manufactured by Seiko Epson Corporation) or a printer/scanner combination (examples of which include, but are not limited to, the Epson TM-J9000, TM-J9100, TM-J7000, TM-J7100, and TM-H6000III, all manufactured by Seiko Epson Corporation) or a digital camera/camcorder combination. An image processing device may include a feature extraction capability, for example, to extract features from an image and then to analyze the image using the extracted features. For example, an image capture device, such as a flatbed scanner, with this feature extraction and analysis capability may include one or more computer-readable media that implement the example method 300. Alternatively, a computer connected to the image capture device may include one or more computer-readable media that implement the example method 300.

Figure 2:
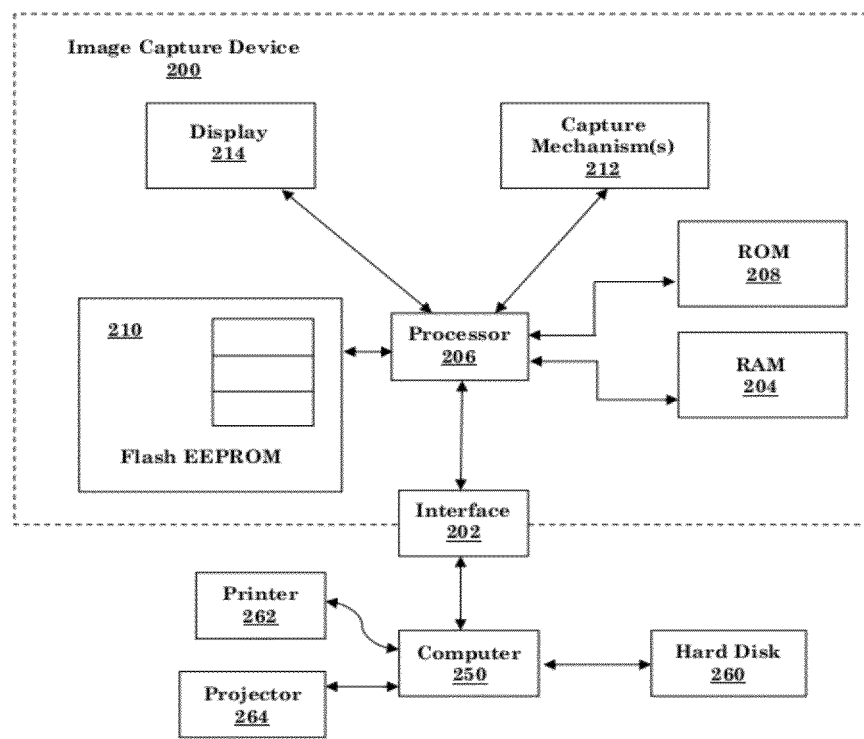
FIG. 2 is a general block diagram of an image capture device and system for utilizing the present invention.

A schematic representation of an example image capture device 200 is shown in FIG. 2. The example image capture device 200 exchanges data with a host computer 250 by way of an intervening interface 202. Application programs and an image capture device driver may also be stored for access on the host computer 250. When an image retrieve command is received from the application program, for example, the image capture device driver controls conversion of the command data to a format suitable for the image capture device 200 and sends the converted command data to the image capture device 200. The driver also receives and interprets various signals and data from the image capture device 200, and provides necessary information to the user by way of the host computer 250.

When data is sent by the host computer 250, the interface 202 receives the data and stores it in a receive buffer forming part of a RAM 204. The RAM 204 can be divided into a number of sections, for example through addressing, and allocated as different buffers, such as a receive buffer or a send buffer. Data, such as digital image data, can also be obtained by the image capture device 200 from the capture mechanism(s) 212, the flash EEPROM 210, or the ROM 208. For example, the capture mechanism(s) 212 can generate a digital image by scanning a source document, such as a book. This digital image can then be stored in the receive buffer or the send buffer of the RAM 204.

A processor 206 uses computer-executable instructions stored on a ROM 208 or on a flash EEPROM 210, for example, to perform a certain function or group of functions, such as the method 300 for example. Where the data in the receive buffer of the RAM 204 is a digital image, for example, the processor 206 can implement the methodological acts of the method 300 on the digital image to extract features in the digital image and further analyze the image based on the extracted features. Further processing in an imaging pipeline may then be performed on the digital image before the image is displayed on a display 214, such as an LCD display for example, or transferred to the host computer 250, for printing on printer 262, projected with projector 264, or stored on hard disk 260, for example.

The example method 300 for extracting features in an image and further analyzing the image based on the extracted features will now be discussed in connection with FIG. 3. Prior to performing method 300, an input image can be targeted for various image processing operations. The input image may a grayscale image, a binary image, a digital color image or a digitized or scanned version of a color image. Various image processing techniques may be applied to the input image before method 300 is performed. For ease of understanding, the following discussion will be divided into the following sections:

A. Input image
    B. Feature image formation
    C. Feature image analysis and segmentation
    D. Page area detection
    E. Book spine detection
    F. Distortion detection, and
    G. Correction A. Input Image In step 302, FIG. 3, a digitized or scanned document constitutes a digital image x with $K_1 \times K_2$ pixels $X_{(r,s)}$ where (r,s) denotes the pixel location with $r=1, 2, \ldots, K_1$ indicating the image row, and $s=1, 2, \ldots, K_2$ indicating the image column. An object of the present invention is to analyze the content of the input image x, primarily for the purpose of scanned book document analysis. It should be understood, however, that the framework of the present invention can be readily adopted for any type of scanned documents such as books, letters, checks, receipts, prescriptions, etc.

B. Feature Image Formation

Feature image formation, analysis, and image segmentation are the subject of commonly owned U.S. patent application Ser. No. 13/075,978, filed Mar. 30, 2011 and entitled "Method of analyzing digital document images", which is hereby incorporated by reference in its entirety. However the present invention, which is directed to detecting the page area and spine, and modeling distortions in the scanned image, as well as correcting such distortions, is not limited to any particular segmentation technique. For completeness and ease of understanding, however the feature-image based segmentation technique described and claimed in commonly owned U.S. patent application Ser. No. 13/075,978, is described in the following sections.

Since scanners typically scan the whole surface of the scanning area and both dimensions and position of the scanned document on the scanner's surface may vary significantly, the present invention employs feature extraction (step 304, FIG. 3) to form a feature image for subsequent analysis. To achieve robustness against various scanning defects and noise introduced into the digitized document images during the scanning process the present invention processes the input image on a block basis. Namely, a block of $g_1 \times g_2$ pixels is selected, where $g_1$ denotes the number of image rows and $g_2$ denotes the number of image columns inside the block. This block is used to extract both foreground and background, which are the two fundamental features of any document image. To allow high-speed processing, the present invention transforms each block of pixels in the image x into a single-pixel in the feature image (step 306). Thus, given the input image size and the block size, the feature image z consists of $K_1/g_1 \times K_2/g_2$ pixels, and it is a two-channel image with pixels $z_{(m,n)} = [f_{(m,n)}, b_{(m,n)}]$, for $m=1, 2, \ldots, K_1/g_1$ and $n=1, 2, \ldots, K_2/g_2$. The terms $f_{(m,n)}$ and $b_{(m,n)}$ denote, respectively, the foreground and background components of the vectorial pixel $z_{(m,n)}$. Each of the foreground and background components will be an 8-bit value, for example. Eight bits allow for 256 discrete values. Thus each block of pixels in the image x is represented by a single pixel $z_{(m,n)}$ having two 8-bit components.

Since most document images have their background significantly brighter than their foreground (foreground can contain the text, line drawings, graphics, and images), the two components of the feature pixel $z_{(m,n)}$ can be determined as follows:

$$f_{(m,n)} = \min\{x_{(r,s)}; (m-1)g_1 < r \leq mg_1, (n-1)g_2 < s \leq ng_2\} \quad (1)$$

$$b_{(m,n)} = \max\{x_{(r,s)}; (m-1)g_1 < r \leq mg_1, (n-1)g_2 < s \leq ng_2\} \quad (2)$$

where min and max are the minimum and maximum operators, respectively. Equations (1) and (2) illustrate the generation of the feature image. Taking the most top-left pixel in the feature image as an example, its corresponding block in the input image is the top-left $g_1 \times g_2$ block. The foreground and background values are the smallest and largest intensity values, respectively, within this block, as defined by $f_{(1,1)} = \min\{x_{(r,s)}; \text{for } 0 < r \leq g_1, 0 < s \leq g2\}$ and $b_{(1,1)} = \max\{x_{(r,s)}; \text{for } 0 < r \leq g_1, 0 < s \leq g2\}$.

As can be seen in the above equations, the present invention divides the input image x into blocks of pixel values, each block being associated with one feature pixel $z_{(m,n)} = [f_{(m,n)}, b_{(m,n)}]$. Representing the input image by a smaller feature image (each block of pixels is reduced to one pixel) greatly reduces computational complexity of subsequent image analysis in the framework.

To display any detection result corresponding to the feature image z in the input image x, the object or bounding box coordinates should be multiplied by $g_1$ in the vertical direction and $g_2$ in the horizontal direction. This will transform coordinates from the feature image domain to the input image domain.

If a number of feature images need to be created, then a computationally efficient way is to first create the feature image of the largest target dimensions and then create another (smaller) feature image from the larger feature image. Depending on the target dimensions of other feature images, this approach can be iteratively repeated resulting in a feature image pyramid.

Any feature image can be enhanced prior to its analysis using low-pass filters in order to eliminate outliers in either of the two channels. If the page orientation is known, then desired enhancement can be produced using directional filters.

If foreground pixels exhibit higher intensities than background pixels, which can be easily determinable from image histogram for example, an inverse version of the original document image should be created and used as the input of the proposed method.

Finally, although the present invention presents embodiments for grayscale images only, the framework proposed in this invention can be readily adopted for binary and color images, as well. For binary images, the application of the proposed framework is straightforward. In the case of color images, a few approaches are possible. For example, one is to transform the three component color data into a single value (e.g., using color-to-grayscale conversion) and then to process such scalar data in the same way as the grayscale or binary data. Another possibility is to apply the proposed framework separately, in a component-wise manner, to each of the three color channels and then combine the intermediate results.

C. Feature Image Analysis and Segmentation

Depending on both the purpose of analysis and the intended application, the feature extraction procedure described above can be used to produce a feature image of specific dimensions or more than one feature image. Parameters $g_1$ and $g_2$ permits a trade-off between the processing speed and the level of segmentation of the image x. For example, large values of $g_1$ and $g_2$ can be used to segment scanned images on the page level whereas moderate and small values are useful when segmenting the image on the paragraph/page column and line/character levels, respectively.

Any of the segmentation procedures described below is based on the evaluation of components $f_{(m,n)}$ and $b_{(m,n)}$ in each pixel location of the feature image z. A small difference between the values of $f_{(m,n)}$ and $b_{(m,n)}$ indicates significant similarity between foreground and background in the block of pixels corresponding to the location (m, n) in the feature image. This can happen in text-free image regions such as document borders and regions surrounding the document in the scanning area or regions with solid graphics, for example. Therefore, page areas can be detected as follows:

$$d_{(m,n)} = \begin{cases} 1 & \text{for } b_{(m,n)} - f_{(m,n)} < \theta \text{ and } b_{(m,n)} > \vartheta \\ 0 & \text{otherwise} \end{cases} \quad (3)$$

where $\theta$ and $\vartheta$ are tunable parameters used to evaluate similarity between foreground and background and identify pixels with high contributions of background and foreground components. The first parameter $\theta$ is compared to the difference between background and foreground values of a pixel in the feature image. An exemplary value is 50. The second parameter $\vartheta$ defines the lowest background value. An exemplary value is 150. These exemplary values are selected based on the fact that the text must have a minimum contrast with the background to be readable and the background of the book image is usually bright. The term $d_{(m,n)}$ is the pixel in the binary map d of dimensions identical to that of the feature image z. The value $d_{(m,n)}=1$ indicates that the location (m, n) in the feature image corresponds to a page area, otherwise the pixel value in the binary map d is set as $d_{(m,n)}=0$.

Equation (3) is not the only solution which can be used to generate the binary object map (step 308, FIG. 3). To reduce the influence of parameters $\theta$ and $\vartheta$ on the segmentation performance, one can generate the binary object map as follows:

$$d_{(m,n)} = \begin{cases} 1 & \text{for } f_{(m,n)} > \beta \\ 0 & \text{otherwise} \end{cases} \quad (4)$$

where $\beta$ is the average value of $b_{(m,n)}$ components which satisfy $b_{(m,n)} - f_{(m,n)} < \theta$ and $b_{(m,n)} > \vartheta$. Again, the value $d_{(m,n)} = 1$ indicates that the location (m,n) in the feature image corresponds to a page area, otherwise the pixel value in the binary map d is set as $d_{(m,n)} = 0$. It should be understood that this invention is not limited to the exemplary solutions in Equation (3) and Equation (4), as the framework of the invention can flexibly be adopted to other solutions rather than these preferred embodiments.

In the present invention, processor 206 subjects the map d to object segmentation by grouping adjacent pixels with $d_{(m,n)}=1$ (step 310, FIG. 3). The procedure partitions the map d into N disjoint objects $O_i = \{(m, n) \in \Phi_i; d^i_{(m,n)} = 1\}$, for $i=1, 2, \ldots, N$ (step 312, FIG. 3). Each object is characterized by $\Phi_i$ which is the set of pixel locations (m, n) where $d^i_{(m,n)}=1$, and a $\Phi_i^y \times \Phi hd i^x$ is a bounding box with height $\Phi_i^y$ and width $\Phi_i^x$. To obtain a better object segmentation result, the map d can be smoothed before creating objects by means of image filtering.

Depending on the scanning quality and resolution as well as the block dimensions, the set of objects $O_1, O_2, \ldots, O_N$ can consist of one or more true objects corresponding to the segmentation target and a number of false objects. Therefore, a set of simple constraints, for example, various geometrical constraints such as size and shape of the objects, can be used to remove undesired objects from further consideration. Specific formulations of such geometrical constraints can differ significantly depending on the segmentation target (e.g., text page area segmentation vs. character segmentation) and the implementation strategy. For example, for the purpose of text page area detection, which is one of the applications of the present invention, the goal is to remove small objects and objects with bounding boxes of irregular aspect ratios. This processing step is straightforward and can be implemented as follows:

$$O_i = \begin{cases} \{d^i_{(m,n)} = 0; (m, n) \in \Phi_i\} & \text{if } \Phi_i^y < T_y \text{ or } \Phi_i^x < T_x \text{ or } \\ & \max(\Phi_i^y, \Phi_i^x)/\min(\Phi_i^y, \Phi_i^x) > T \\ O_i & \text{otherwise} \end{cases} \quad (5)$$

where $T_y$ and $T_x$ denote the minimum height and width of an object and T is the maximum aspect ratio of the object.

These parameters can be predetermined or determined adaptively from the set of objects (for example, as a mean or weighted mean over all segmented objects where larger weights are associated with larger objects). An object which satisfies one or more conditions in Equation (5) is removed from the object list and this can be accompanied by setting the corresponding pixels $d_{(m,n)}$ in the binary map d to zero. Note that Equation (5) is an example implementation and that the present invention is not limited to the above embodiment.

If the result of the segmentation is two objects, the page orientation can be determined based on the relative position and/or dimensions of these objects. If the result is one page only, the page orientation can be determined by comparing the height to the width of the object. For the sake of simplicity the following discussion will assume the book pages are in vertical orientation, meaning one page is above the other in the image.

It should be noted that the bounding boxes of the detected objects are accurate up to $g_1 \times g_2$ pixels in image width and height dimension. To increase their accuracy, object boundary refinement procedure can be used. The next section will give an example to illustrate how the page area is detected.

D. Page Area Detection (Step 314, FIG. 3)

Figure 4:
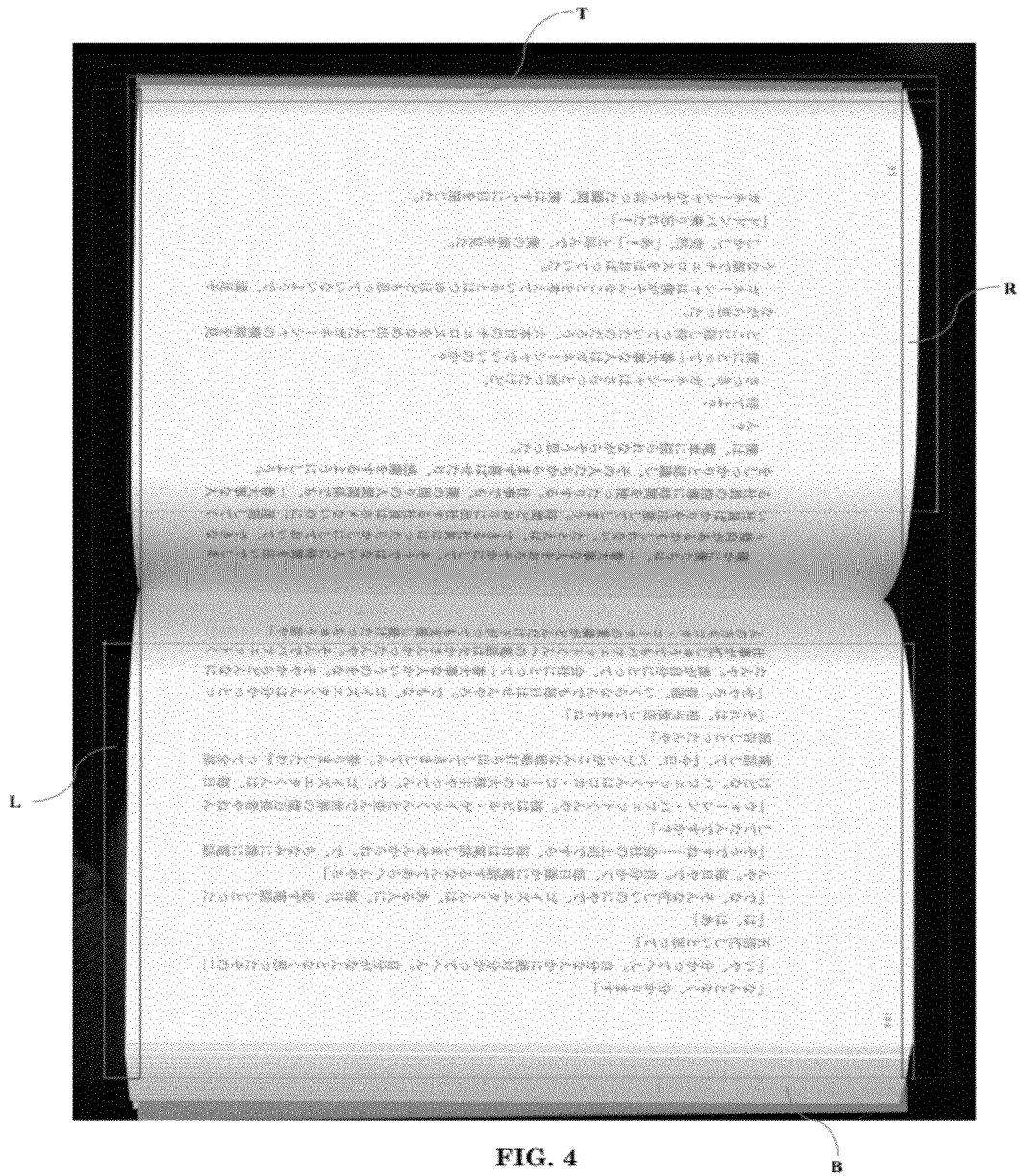
FIG. 4 illustrates the initial page bounding boxes of search regions for top, bottom, left and right boundaries.

In case of scanned book documents, the result of feature image segmentation is always one or two objects, depending on the number of pages scanned. In many document image applications defining an area without losing text/graphics on the pages is often desired. When the book image has two pages, a box enclosing both page objects is used to estimate the image location of entire book pages. However, this estimation is sometimes very coarse. A search for an accurate page bounding box is then conducted around the boundaries of this initial bounding box. As illustrated in FIG. 4, the search areas for the top T and bottom B box boundary are $n \times g_2$ high and areas for the left L and right R box boundary are $m \times g_1$ wide, where n and m each are a value greater or equal to 2, depending on the processing time and accuracy requirement. The present invention uses a searching method based on the fact that when the book pages are smaller than the scanning surface the scanned image has dark areas, also called non-scan areas, surrounding the actual pages. The dark area's brightness is predefined (e.g. 80) to separate it from the page image. To find the page box boundary in an image height dimension a row-by-row scanning is carried out in the corresponding search areas. The scanning starts from the first row in the top search area, while an opposite scanning order is used in the search area for bottom page box boundary. The scanning will stop when a minimum number of consecutive rows have a large portion of pixels brighter than the non-scan area. The same searching strategy is operated on a column-wise basis to find the page box boundaries in an image width dimension.

Considering that the book may have a noticeable tilt angle and the page objects are not aligned horizontally the method described above will produce a bounding box larger than the actual page area. In this case an alternative solution is applying the same boundary detection method on each page object separately to refine its boundaries in three directions. In the end the two refined bounding boxes of the top and bottom page object will be merged to create a new bounding box of the entire page area.

The present invention uses the feature image to detect the shadow distortion. Since the other two types of distortions, namely squeeze and curvature, often appear together with shadow around the spine, the areas that have shadow distortion identified can be further used as the initial search region for these two distortions.

E. Book Spine Detection (Step 316, FIG. 3)

In the case of scanning books, the determination of the book spine region can be of interest, for example, for the purpose of separating the two pages or correcting the distortions. The present invention finds the book spine in a two-page book image using a 3-step procedure: (1) first locate the plain background area between two pages. Limiting the detection of book spine in this area can reduce the chance of mistaking foreground graphics as book spine. However when a very thick book is scanned, its image, for example the image shown in FIG. 1, text and other foreground contents from the two pages are only separated by the book spine. In this case the region must be defined differently. The simplest way is to set the area between two page objects as the search region. When the search region is too small to perform the following processing, it has to extend to reach a minimum size. (2) Since curvature distortion changes the page border curvature around the book spine, the shape of the page border can indicate the location of the book spine when the distortion exists. The second step of spine detection is to analyze the page borders of the interest region. If the borders are straight, proceed to step 3, otherwise estimate the spine using the obtained curvatures. (3) When the book spine can not be located using page borders, a modified Hough Transform-based line detection will be applied in the search region to find the spine line.

E.1 Detection of the Plain Background Between Two Pages

Figure 5:
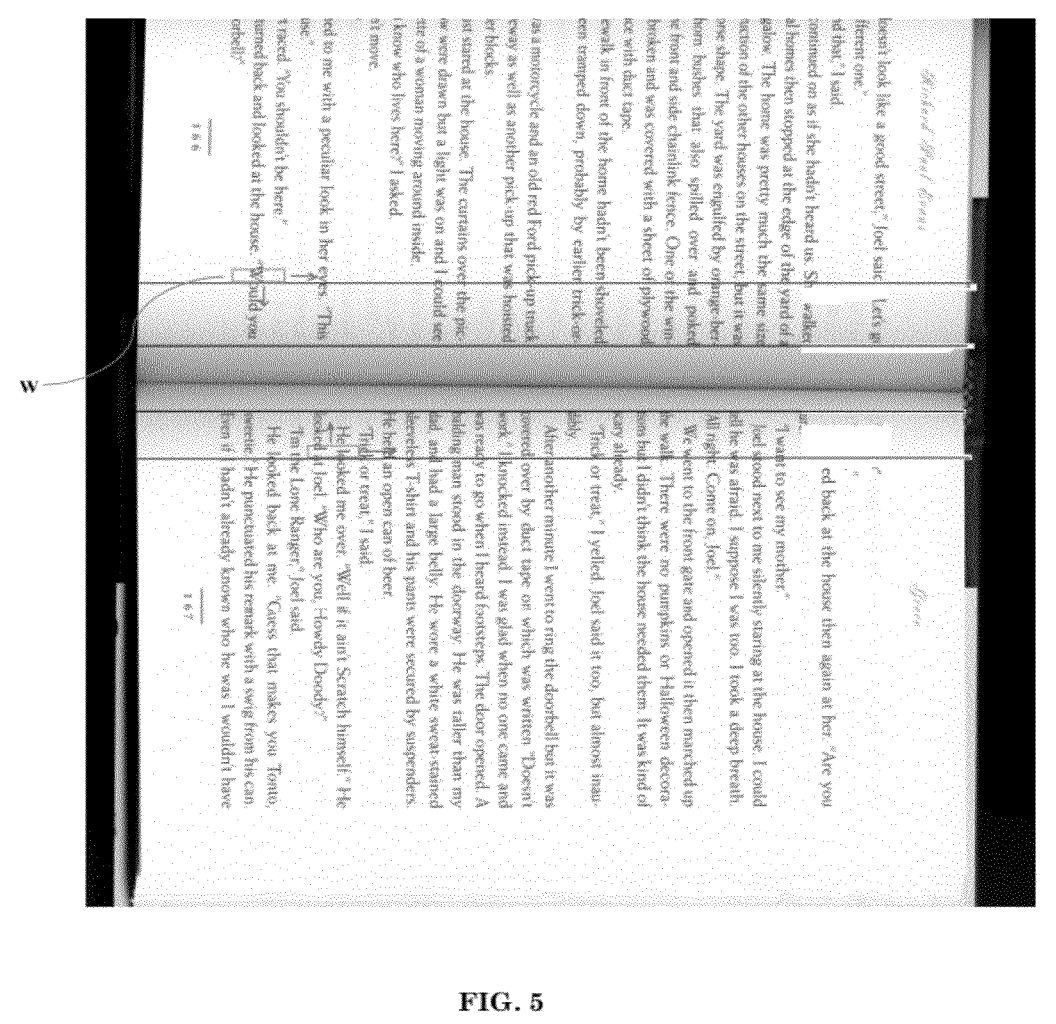

Assume the interested plain background lies between two image rows, $l_t$ and $l_b$, in the image height dimension. The object of the detection here is to find $l_t$ and $l_b$. The searching for $l_t$ starts from the center of the top page object and stops at the top of the bottom page object. The searching is done by moving a window W (FIG. 5) of a predefined size left-to-right and top-to-bottom in the interested region. One window location does not overlap with the others. At each location an algorithm is used to check whether the image has text inside the window. When a minimum number of windows on the same image height are found containing text, the window will be moved down toward the bottom page. The searching starts again from the left boundary of the interested region. If text are detected in fewer windows on the new image height, then the first image row where the current window occupies is set as the desired border $l_t$. After $l_t$ is set a bottom-to-top searching for $l_b$ is carried out from the center of the bottom page object to $l_t$.

The algorithm of the present invention for text detection is designed based on two rules: (1) text has contrast to background; and (2) characters have stokes (edges) and a wide distribution of edge orientation. Since edge analysis is relatively computationally expensive it will only be applied as a step of verification on windows that qualify the first rule. Therefore the first step of text detection is calculating the image intensity contrast of each window and comparing it with a predefined minimum value. A quick way to obtain the contrast is retrieving each window's corresponding maximum and minimum intensity from the existing feature image z and computing the ratio. To verify the existence of text or characters, edges are extracted inside the window. Edge density and distribution of edge orientation are two criteria to achieve reliable text detection. Two parameters are involved in the verification. One is the minimum edge density of image inside every window. The other defines how wide the edge orientation must spread over 0~360 degree spectrum.

E.2 Spine Detection Using Page Border

Figure 6:
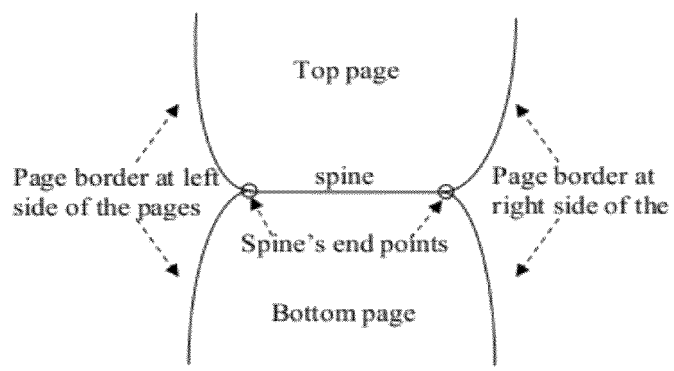
FIG. 6 illustrates spine detection by analyzing the shape of page borders.

The key to spine detection using page borders inside the interested region is reliable extraction of the page borders in image width dimension. The extraction algorithm of the present invention is applied separately on the border areas at both left and right side of book pages. After a binary image of each border area is generated by a careful segmentation, the border between pages and non-scan area are extracted. It is represented by a set of image points on one or two curves as illustrated in FIG. 6. To analyze the border's shape in an efficient and accurate manner the curves are approximated mathematically. Then the decision about whether the pages have a straight border or a curvature on one side of the pages can be made. If a bent page border is found, the end point of the spine will be estimated from the curvature. Detection of both end points of the spine eventually yields the image location of the spine. It needs to be noted that the two interested page borders are not always symmetrical and the same border may bend differently at spine in top and bottom page.

E.2.1 Extraction of Page Border

In the binary image of a page border area a border tracing algorithm is employed in the present invention to detect border in 8-connectivity. Assume the non-scan area is at the left side of the page border, the seed pixel or the staring point of a border candidate is searched from top left corner of the binary image. The border will be traced from this point toward the image bottom. One modification made to the typical tracing algorithm is that the tracing will stop when the border turns flat horizontally or upward over a minimum length.

Figure 7A:
FIG. 7A illustrates an example of a binary page border image with a single border being detected.
Figure 7B:
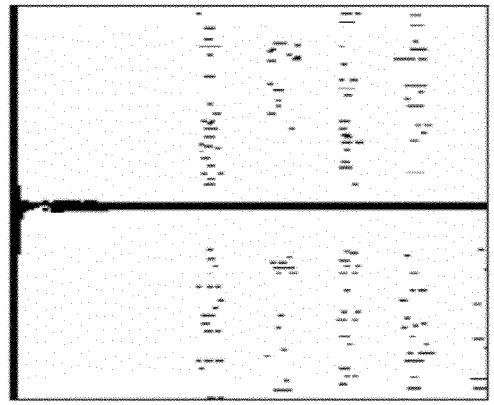
FIG. 7B illustrates an example of a binary page border image with two separate borders being detected.

This modified border tracing algorithm of the present invention can find a single border in the image shown in FIG. 7A. Its turning point will later divide it into two curves in the step of evaluation. In some cases like the image shown in FIG.

7B one border at top of the image will be found first. Since this border does not reach the image bottom the image will be flipped vertically and the same tracing algorithm will be carried out again. In the end two borders are detected. In this example the straight page border is broken into two segments by the spine because the image is dark around the spine.

E.2.2 Curvature Analysis and Spine End Point Estimation

The objective of curvature analysis for spine detection is to determine whether the page border bends toward the same point in both at the top and bottom page because this point can indicate the image location of the spine line on one side of the page area. The page border extraction yields one or two curves, each of which is described by a set of points on it. The first step to analyze one curve is to fit its points to a mathematical model because representing the curve by a small number of coefficients makes it easy to analyze its shape. If the extracted curves are almost straight it is safe to conclude that the page has a straight border. Otherwise one more step of processing is needed to check whether the border is made up by two curves that bend toward one point. To reduce the effect of image noise and detection error in curve extraction on the curvature, the points on each extracted curve will be smoothed before curvature analysis.

Figure 8:
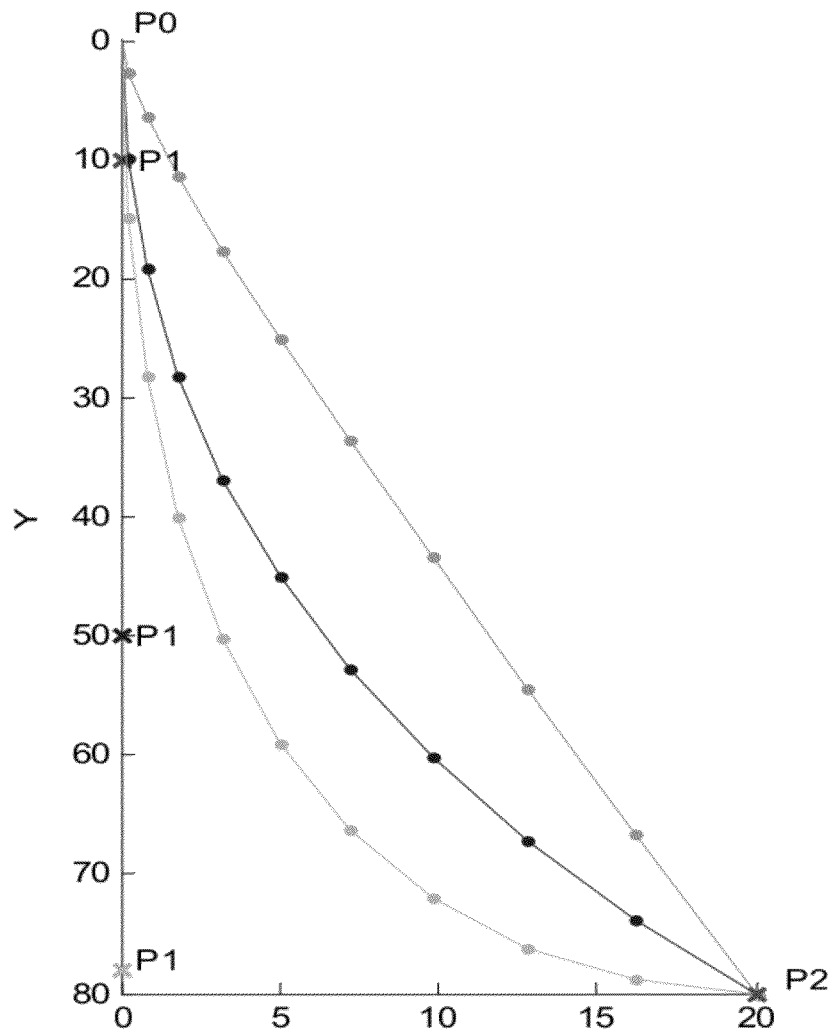
FIG. 8 illustrates examples of Bezier curves with different control points $P_1$.

In the present invention, a quadratic Bezier curve is used as the model. It is a parametric curve that can be described by three control points: $P_0(x_0, y_0)$, $P_1(x_1, y_1)$, and $P_2(x_2, y_2)$. With reference to FIG. 8, taking the curve on the top left border as an example the curve begins at $P_0$ and ends at $P_2$ and its path can be traced by the function B(t).

$$B(t)=(1-t)^2 P_0 + 2(1-t)t P_1 + t^2 P_2, t \in [0,1].$$

Since the page border should be a smooth curve or line in the spine line search region, the model is simplified by assuming that the start of the curve has a 90-degree tangent, which implies the points $P_0$ and $P_1$ are in the same image column ($x_0=x_1$). The function B(t) can then be described by $$x(t)=1-t^2 x_0 + t^2 x_2$$

$$y(t)=(1-t)^2 y_0 + 2(1-t)t y_1 + t^2 y_2$$

The points $P_0$ and $P_2$ are considered on the same image height as the first and the last points on the curve. Knowing $y_0$ and $y_2$ the problem of fitting the curve's m points to a Bezier model is to solve $x_0$, $x_2$ and $y_1$ in a least-error manner.

After the best estimation of the three points is obtained, their geometry will be examined. The curve is a straight line if and only if all three control points are collinear, which could occur in the following three cases:

Case 1: the start point $P_0$ and the end point $P_2$ have a very small offset in x dimension.

Case 2: the points $P_0$ and $P_1$ are too close. As illustrated in FIG. 8 when $P_1$ approaches $P_0$ the curve becomes straight.

Case 3: the point $P_1$ is very close to the point $P_2$. It usually suggests the curve is close to straight throughout most of the interested region and only bends very sharply at the end. This case happens mostly due to curve extraction errors.

Figure 9:
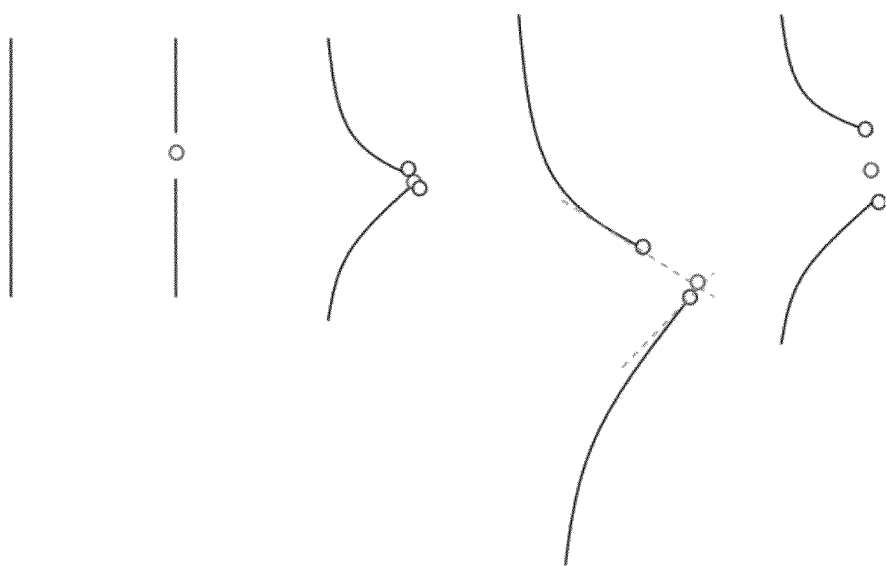
FIG. 9 illustrates five cases of calculating the spine end point.

The following are five common situations that could occur on one page border, and they will lead to different results as shown in FIG. 9:

(1) if a single border is detected and determined straight no spine end point can be estimated;
(2) if two straight lines are detected in top and bottom page, the spine end point will be set to the middle of the two lines;
(3) if a single border is detected and approximated to two Bezier curves, the spine end point will be the middle point between the two end control points of the Bezier curves;
(4) if two separate borders are detected and fit to Bezier curves, when the two curves are close to each other, the spine end point will be interpolated to the point where the two curves might intersect; and
(5) when two curves are either apart by a large distance or no crossing point is found in case of 4, the spine end point will be set as the middle point between the two end points of the Bezier curves.

F. Distortion Detection (Step 318, FIG. 3)

Scanned images of book pages often have three types of distortions generated by scanning. Depending on the book's orientation relative to the scanning direction when it lays on the scanning surface and the elevation of the book spine area above the surface, these three types of distortion appear at different levels. When the book spine is above the scanning surface the scanned image usually has shadows appearing in the image close to the spine. The other two types of distortions happen for the same reason but only when a book is scanned with its spine parallel to the scanner sensor bar, referred to as the "parallel scanning case." In this case, the page image squeezes toward the spine and consequently the text closer to the spine become thin and difficult to recognize. Beside this "squeeze" distortion the text close to spine also bends toward the center of the page. This type of distortion is referred to as "curvature distortion" in the present specification. The following sections discuss aspects of the present invention for detecting each distortion. The detection will be executed in both left and right side of the top and bottom page. The detected distortions are approximated by Bezier curves to be used in a correction procedure.

F.1 Shadow Distortion

Figure 10:
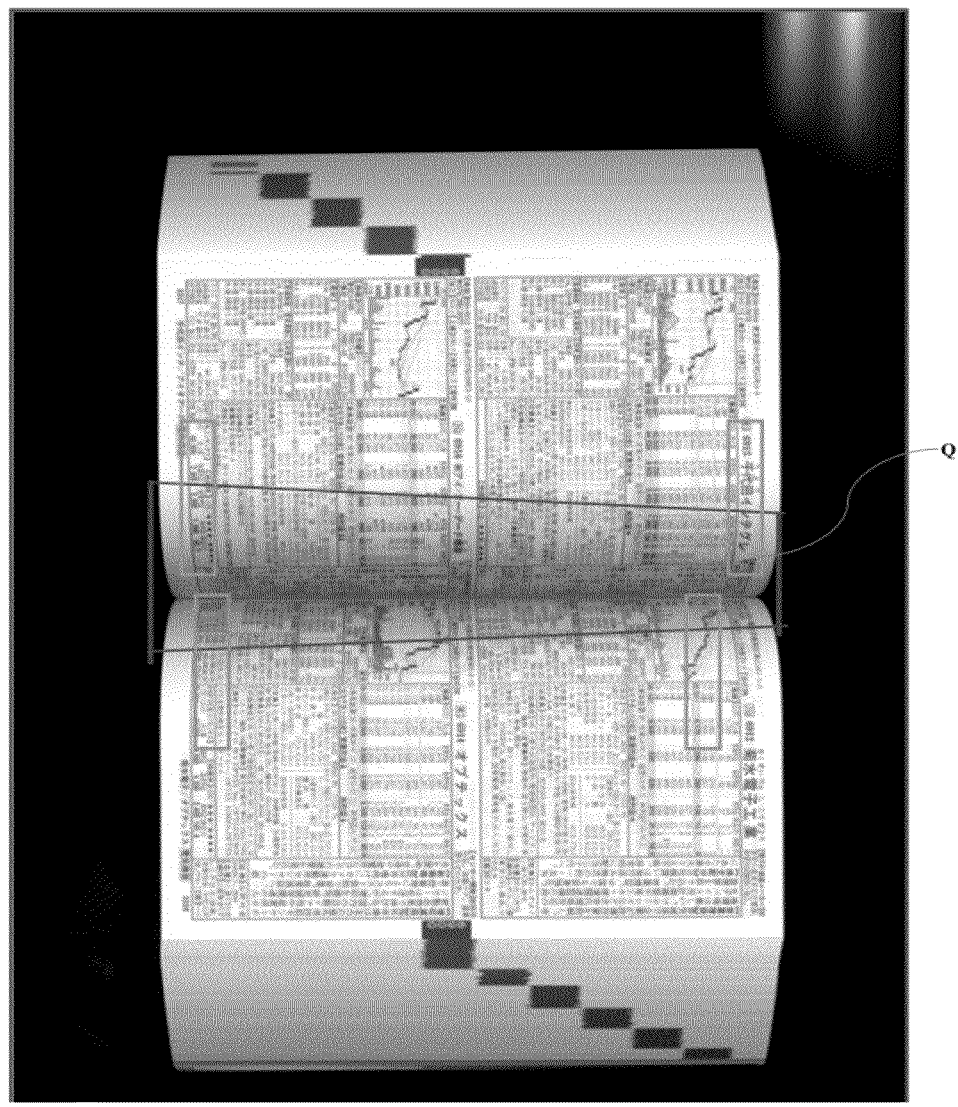
FIG. 10 illustrates the shadow distortion in a scanned book.

In the image having shadow distortion the background of the page becomes noticeably darker from some point towards the spine. The inputs for the detection method of the present invention are the background component $b_{(m,n)}$ from the feature image, the page objects, and the page border area. Referring to FIG. 10, assume the distortion area is a quadrangle Q that has corners at left and right side of the top and bottom page, the processor locates its four corners using the following steps.

First, in the feature image, the processor selects a first column next to a left border of the page area and tracks the values of background components of pixels in the first column from a center of a top page object to a middle of the two page objects.

Preferably, the processor smoothes the background component values in the selected column horizontally by a Gaussian filter to produce a robust background intensity estimation.

The processor then checks whether the smoothed background estimation has a top-to-bottom decline that is greater than a minimum value (30, for example). The location where the fall-off starts in the selected column is then mapped back to the original scanned image. The resultant image coordinate is the top-left corner of shadow distortion area in the original scanned image. If the top-to-bottom decline is not greater than the minimum value, a different column next to the left border is selected for examination, preferably the column next to the first column that was selected.

The processor then selects a column next to the right border of the top page, and repeats the above three steps to find the top-right corner of the shadow distortion area in the top page.

The processor repeats the above steps to find the bottom-left and bottom-right corners of the shadow distortion area in the bottom page. The desired fall-off of page background in the bottom page is from bottom to top.

The accuracy of this shadow distortion detection algorithm relies on the selection of the interested columns in the feature image. It is important to use the feature image as close as possible to the page borders. In cases where graphics on the pages makes the page border area unsuitable to represent the page background the detected distortion area has to be interpolated to the page border to be accurate.

F.2 Intensity Warping Parameter Detection

Figure 11:
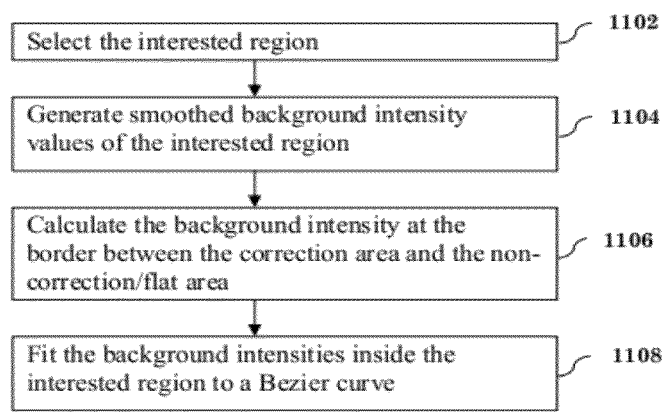
FIG. 11 is a general flowchart of the intensity warping parameter detection process of the present invention.

Intensity warping detection detects the presence of shadow and approximates the intensity change in the direction perpendicular to the spine. The input to this detection is the intensity feature image discussed above in Sections B and C. FIG. 11 is a general flowchart of the process. Given the page border region as extracted in Section E.2.1 above, the first step (FIG. 11, step 1102) in the shadow detection is to select one column in the intensity feature image to estimate how the page background intensity changes toward the book spine. The background intensities of this region will be smoothed by a Gaussian filter (step 1104). The new intensity values are fit to a Bezier curve. To ensure a smooth transition from the non-correction/flat area to the correction area, the intensity level on the border between these two areas will be calculated and used as the start point of the Bezier curve (step 1106). The intensity warping will be parameterized by three control points of the estimated Bezier curve (step 1108).

Figure 12:
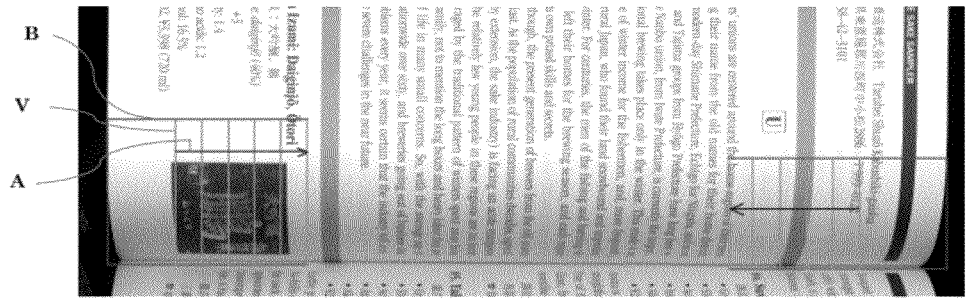
FIG. 12 illustrates the automatic selection of one strip in the image to detect a shadow.

In the present invention, the detection region is automatically selected as follows. One image column in the intensity feature image corresponds to a rectangle region in the original image. It is advantageous to select a region as close to the page border as possible to achieve better correction results. A search area is defined to find the optimum region. The search area is selected in accordance with the page border, the correction area point and the spine location. FIG. 12 illustrates an example where the outside boxes B form the boundary of the search region, the vertical lines V form the boundary of each candidate strip, and the arrows V show the scanning direction. In the example shown in FIG. 12, the search area in the left side of the page is a rectangle defined as top: image Y coord. of the correction area point at the left side of the page
bottom: image Y coord. of the spine
left: page left border+half of the Gaussian filter length
width: max number of strips for selection.

Similarly the search area in the right side of the page is defined as:

top: image Y coord. of the correction area point at the right side of the page
bottom: image Y coord. of the spine
right: page right border−half of the Gaussian filter length
width: max number of strips for selection.

Because some figures or foreground textures on the page can distort the intensity feature image and consequently cause a wrong estimation of the intensity variance, it is important to avoid using areas that contains such figures. Each candidate region, marked as vertical strips in FIG. 12, is examined by counting the dark blocks using the intensity feature image. The first region in the scanning direction that does not have a dark block is selected as the optimum interested region for intensity parameter detection. In cases where all regions have a different number of dark blocks, the region that has the least dark blocks is selected.

Figure 13:
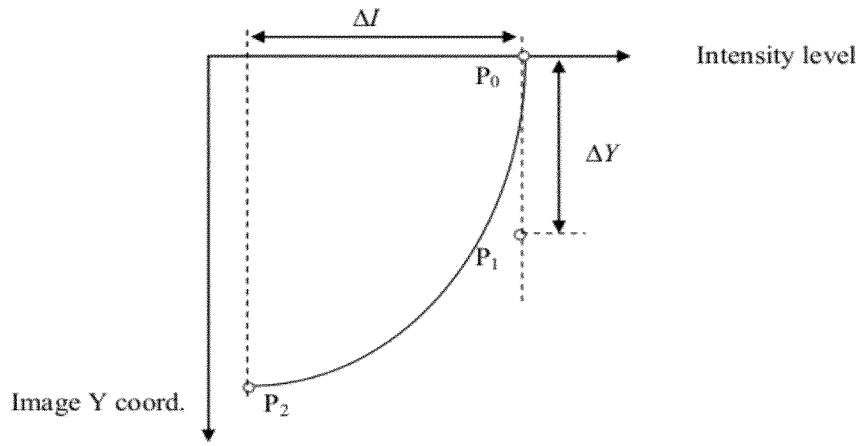
FIG. 13 illustrates an intensity curve.

In the present invention, the intensity parameters are calculated as follows. FIG. 13 illustrates an intensity curve. Assume a column x in the intensity feature image is selected and n background intensity values on this column are available for intensity curve estimation. The curve represents background intensity as a function of image coordinate Y. We denote the intensity function by $I=f(y)$.

Figure 14:
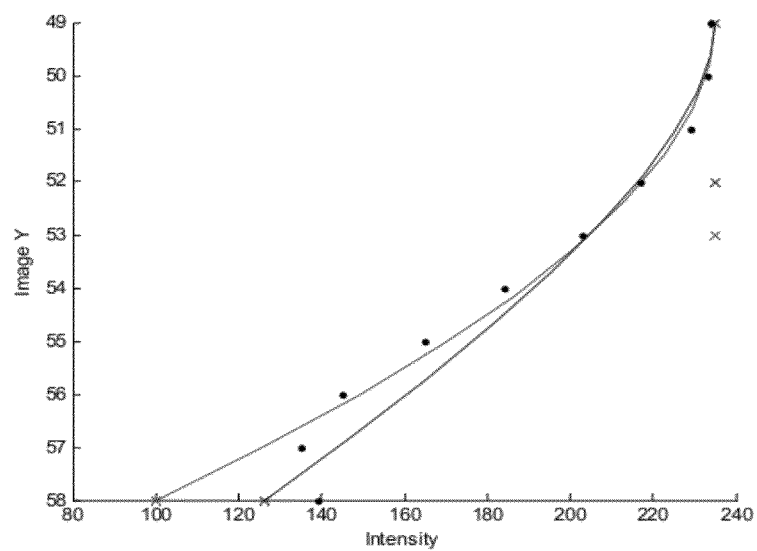
FIG. 14 illustrates the process of intensity curve fitting.

We have found that the background intensity around spine is not always the lowest. FIG. 14 shows an example where the background intensity falls to the lowest before the spine is reached. In FIG. 14, the black dots represent the background intensity values used for fitting a curve. The upper curve (starting at about 100) and associated cross markers represents the curve and its control points obtained using all available intensity values. The lower curve (starting at about 125) and associated cross markers represents the curve and its control points estimated using selected intensity values. If the curve is estimated using all values, it will not approximate most points very well. In order to achieve a better fitting result the values that lead the intensity to an opposite direction are excluded from the fitting. The turning point of the curve can be detected by gradient. After discarding the point following this turning point the upper curve (starting at about 100) is estimated. It is apparent that the curve will not produce an even close approximation of background intensity in the area where the discarded points are in the image. Therefore the intensity value of the turning point is used to set the lower bound of the curve $I_L$. Thus, given an image point (x,y) the background intensity will be estimated by $I=\min(f(y),I_L)$ The function $f(y)$ includes following parameters:

$I_0$: the intensity value at the start point $P_0$
$\Delta I$: the maximum intensity variance
$\Delta Y$: the distance of the control point $P_1$ to the start point $P_0$
$I_L$: the minimum intensity approximation value.

F.3 Squeeze Warping Parameter Detection

In the area around the spine, the squeeze distortion causes the characters to be smaller in the direction perpendicular to the spine. The squeeze varies depending on the image location. In the image where the spine is horizontal the squeeze in the image height dimension can be represented as a function of the image Y coordinate $\delta=y-y'=f(y)$, where y is the expected image coordinate if there is no squeeze and y' is the actual image coordinate due to the squeeze. Since the squeeze usually appears together with shadow and the intensity curve can be obtained by the method described above in Section F.1, we attempt to transform the background intensity curve to the squeeze curve at the same image X location.

Figure 15:
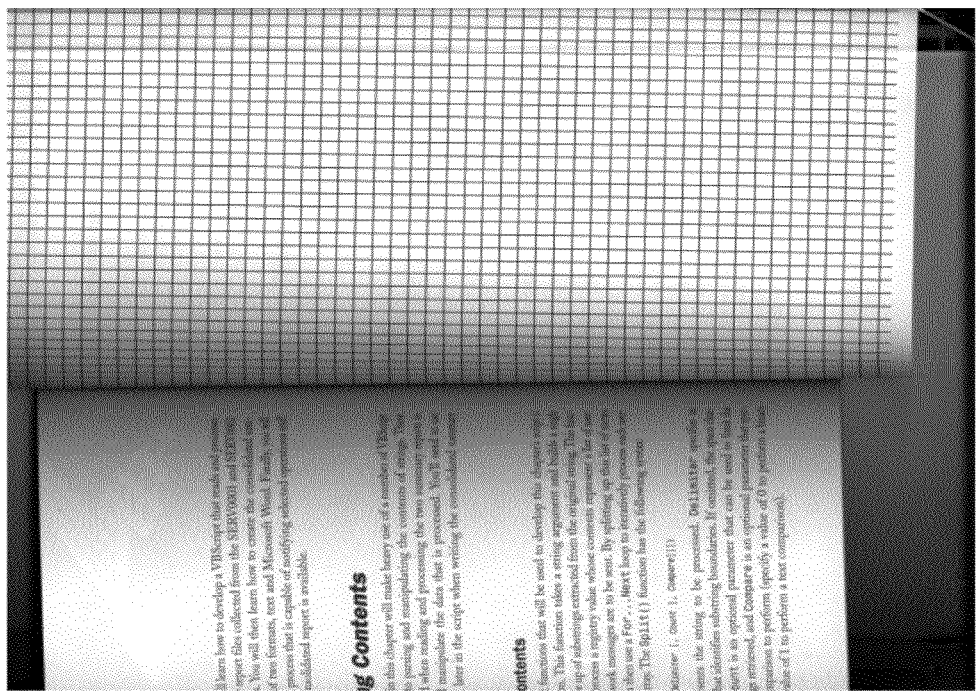
FIG. 15 shows one image of a scanned book with a grid sheet used for calibration.

In order to investigate the relationship between the background intensity curve and the squeeze curve, a grid sheet is inserted in the book and scanned with the grid sheet place at different angles and with different pressures applied to the book. FIG. 15 shows one of the scanned images. With these calibration images we are able to measure the squeeze at the location where the intensity curve is estimated.

Figure 16:
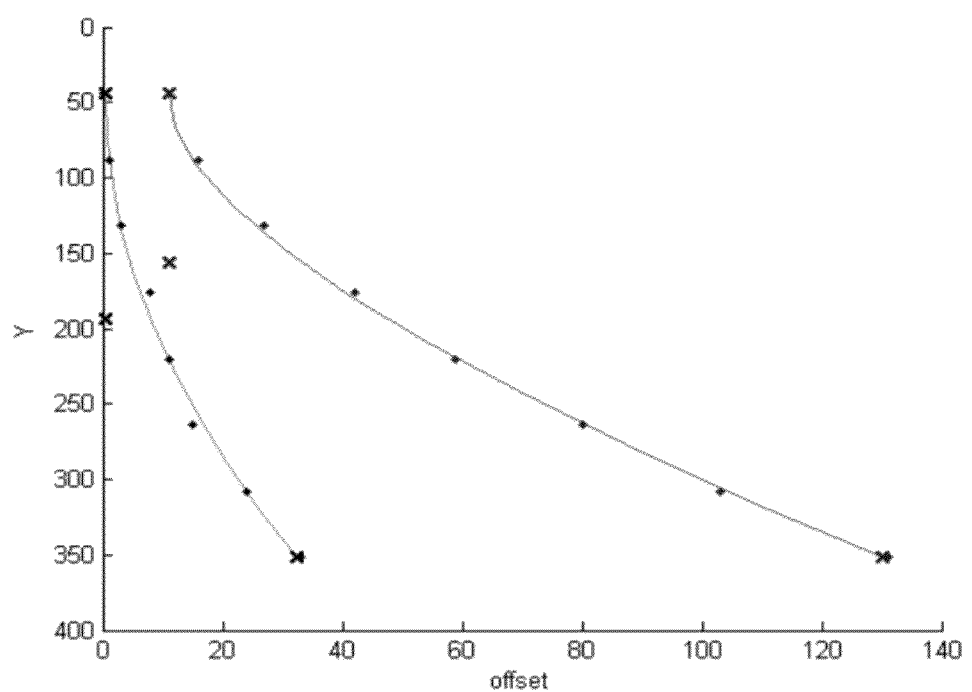
FIG. 16 is a plot of the intensity curve and the squeeze curve from one calibration image.

As illustrated in FIG. 16 both intensity and squeeze can be represented by Bezier curves. The rightmost curve and cross markers are the intensity-image Y curve and its control points. The leftmost curve and cross markers are the squeeze-image Y curve and its control points. They satisfy the following two conditions:

(1) both curves start and end at the same image height
(2) the squeeze curve is assumed having no squeeze at its start point.

Assume the intensity curve is $I=f(y)$ parameterized by $I_0$: the intensity value at the start point $P_0$
$\Delta I$: the maximum intensity variance
$\Delta Y$: the distance of the control point $P_1$ to the start point $P_0$ relative to the distance between the start and end point.

$$\Delta Y = \frac{Y_{P_1} - Y_{P_0}}{Y_{P_2} - Y_{P_1}}$$

$I_L$: the minimum intensity approximation value

Similarly the expected horizontal curve $\delta = y - y' = f(y)$ will be parameterized by $\Delta\delta$: the maximum squeeze happened at the end point $\Delta Y_S$: the distance of the control point $P_1$ to the start point $P_0$ relative to the distance between the start and end point.

Transforming the intensity curve to squeeze curve requires the modeling of $\Delta\delta$ and $\Delta Y_S$.

Figure 17:
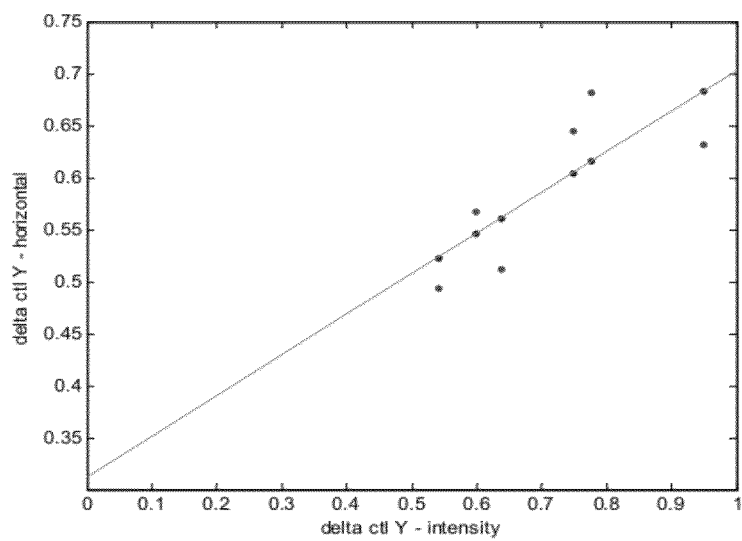
FIG. 17 illustrates modeling of the $\Delta Y$-$\Delta Y_S$ relationship using calibration data.

FIG. 17 illustrates modeling of the $\Delta Y$-$\Delta Y_S$ relationship using calibration data. The data ($\Delta Y$, $\Delta Y_S$) obtained from calibration images are shown as dots off the line. A linear formula is used to model $\Delta Y$-$\Delta Y_S$ relationship. The dots on the line indicate the data estimated from the model.

Each of $\Delta Y_S$ and $\Delta Y$ is a value between 0 and 1. Based on the analysis of the calibration data, their relationship is modeled linearly by $$\Delta Y_S = 0.2033 \times \Delta Y + 0.3605.$$

Figure 18:
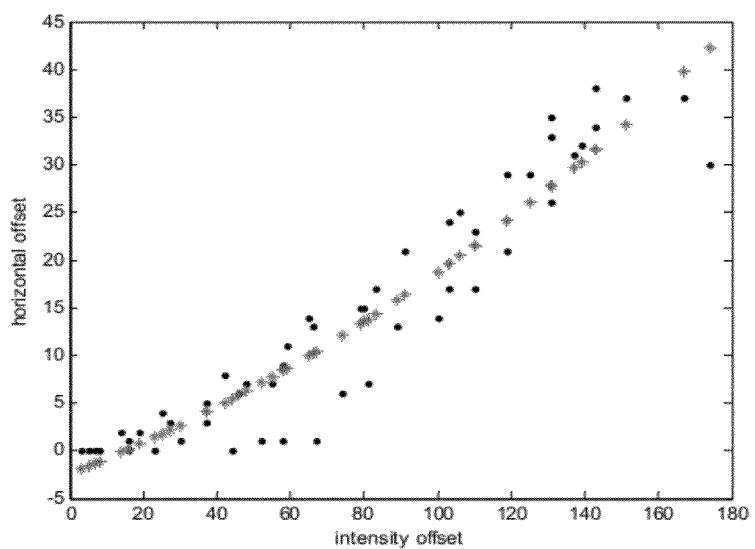
FIG. 18 illustrates modeling of the $\Delta I$-$\Delta \delta$ relationship using calibration data.

FIG. 18 illustrates modeling of the $\Delta I$-$\Delta\delta$ relationship using calibration data. The calibration data ($\Delta I$, $\Delta\delta$) are shown as black dots and they are approximated by a second-order polynomial illustrated by the markers.

Using the calibration data ($\Delta I$, $\Delta\delta$) we obtained a second-order polynomial to estimate $\Delta\delta$ given a value of $\Delta I$ $$\Delta\delta = 0.0015 \times (\Delta I)^2 + 0.1 \times \Delta I - 1.8.$$

F.4 Curvature Warping Parameter Detection

The curvature distortion will affect the image contents as well as the page borders. The characters, especially in the area around the spine, will shift toward the center of the page. Also, the page border is no long straight. Instead, it will bend toward the center. Given the correction area and the spine location, the detection of the curvature distortion will be performed using the page border first. If the border is not extracted or its shape can not be reliably approximated to a Bezier curve, an area that contains characters will be automatically selected and the curvature will be estimated from the characters.

F.4.1 Curvature Detection Using Page Border

Figure 19:
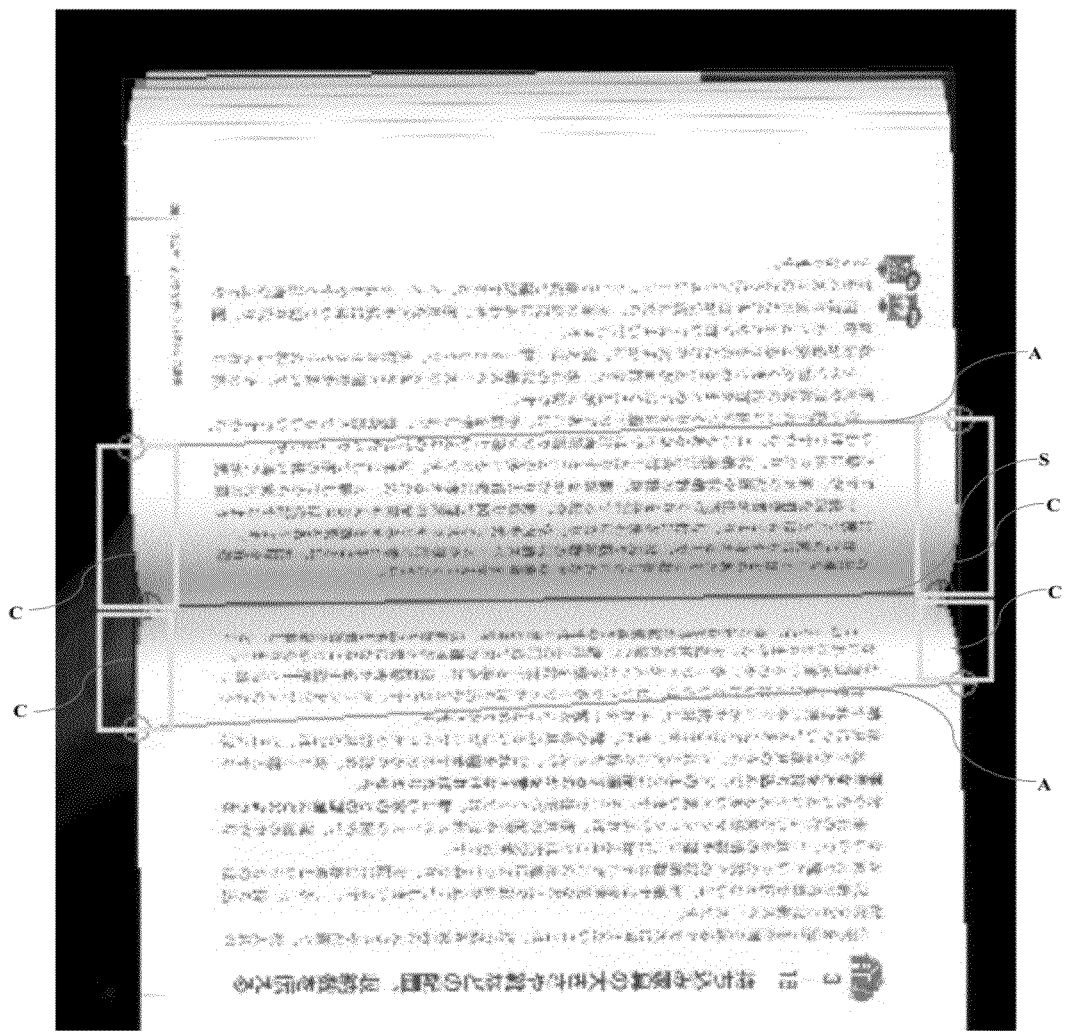
FIG. 19 shows and example of the curvature detection.

FIG. 19 is an example of the curvature detection. Lines C indicate the correction area. The spine is line S. Four curvatures (curves C linking the correction area border A and the spine S) are detected at left and right side in the top and bottom page. The regions where the curvatures are detected are marked by rectangles. For the details of the page border extraction and curvature analysis estimation algorithm refer to Section E.2.2 above. Because the correction area is defined based on the intensity change with a certain level of accuracy, it is possible that the page border does not start to bend from the beginning of the correction area. Correction for curvature distortion will use the detected curvature to model the distortion.

F.4.2 Curvature Detection Using Characters

When the book spine is in a horizontal orientation, a search region at one side of either the top or bottom page will be defined automatically and text inside the region will be used to detect the curvature distortion. One assumption of this curvature detection method is that the text inside the search region is in similar font size and color/intensity.

F.4.2.1 Text Region Detection

Figure 20:
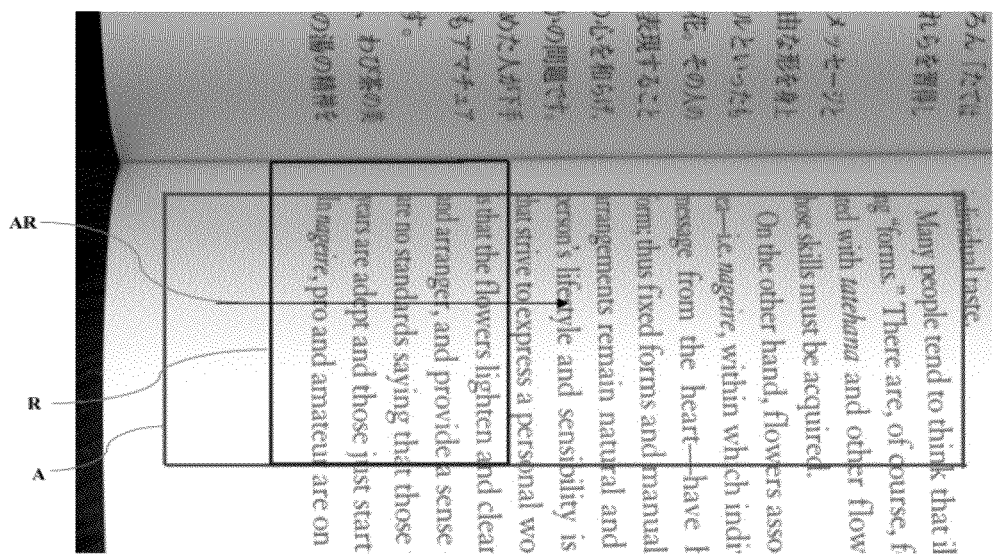
FIG. 20 illustrates detection of the test region at the left side of the bottom page.

FIG. 20 illustrates detection of a text region at the left side of the bottom page. The region R was selected after searching the area A from the left border of the page to the page center. The searching is conducted from left to right as indicated by the arrow AR. The curvature will be detected at both the left and right side of the page. On each side the search area starts with a distance from the page border and ends at the center of the page. Because the curvature is desired to be detected close to the page border, the searching on the left side of the page is from left to right. While on the right side of the page the searching will be conducted from right to left.

The search area's vertical dimension in the example given in FIG. 20 is from where the text starts in the bottom page and ends at the correction area boundary. The text region that is to be selected has a predefined image width (ex: 200 pixels). The searching involves moving a 200-pixel window and checking whether there is sufficient text inside the window.

F.4.2.2 Curvature Detection

The curvature detection algorithm can be summarized by four steps:

(1) text segmentation.
(2) curvature approximation
(3) selection of text segments in curve fitting
(4) evaluation of approximated curve.

Figure 21:
FIG. 21 illustrates an example of curves detected in two text regions.

FIG. 21 illustrates an example of curves detected in two text regions.

In detail, the curvature detection algorithm is as follows:

In the given text region, (1) segment the text from page background (use edges to calculate the intensity thresholds)
(2) divide the region horizontally into n overlapping blocks
(3) in each block
  calculate the projection of the thresholded b/w image on x axis
  extract the text segment candidates from the projection
  if there is more than one segment found, merge small adjacent segment candidates based on width and density
  update the estimation of text font size and density
(4) refine the extracted text segments using the final estimation of the text. Delete the segments that are too large or too small.
(5) create a string of either start or end points of text segments. The first string will be the closest to the page border.
(6) examine the points on the current string. Apply ×64 rule (majority-over-minority) to reject outliers. Then approximate the remaining points by a Bezier curve.
(7) if the current string doesn't have sufficient points to estimate curve reliably or the resultant curve bends suddenly. The next string will be found and step 5-7 will be repeated until all strings are examined.

G. Correction (Step 320, FIG. 3)

Figure 22:
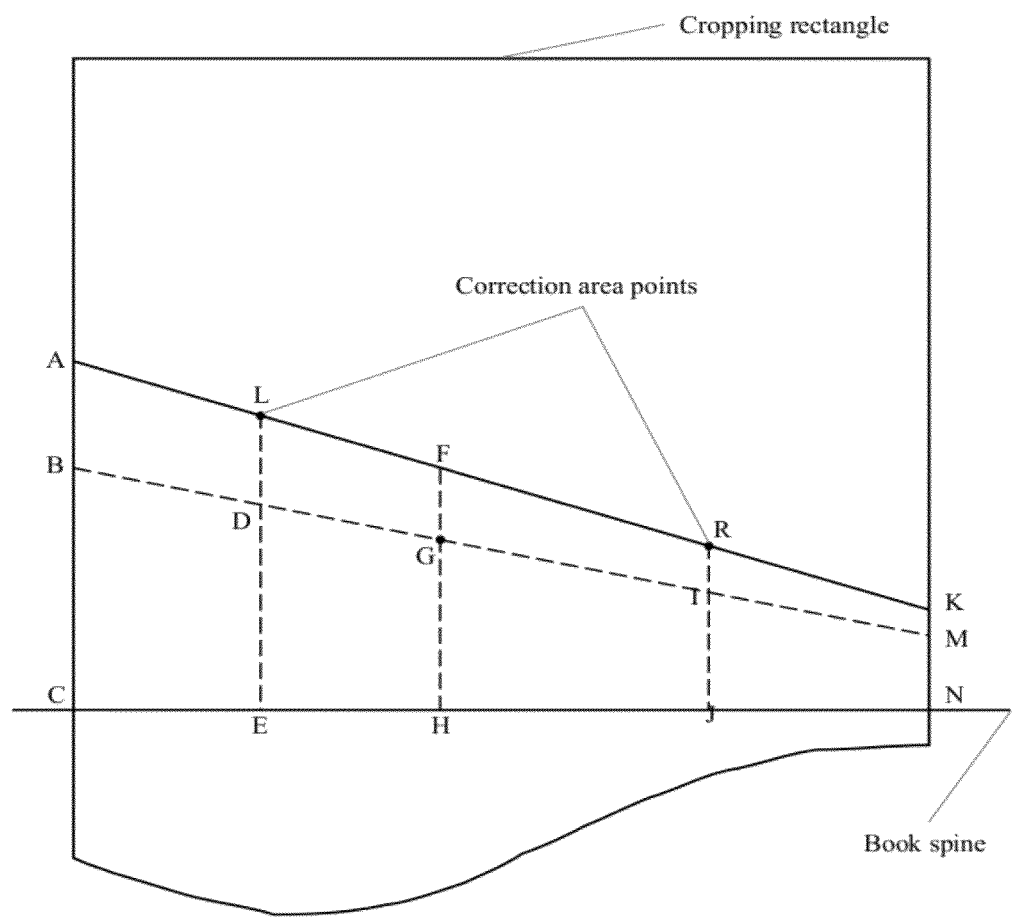
FIG. 22 shows the definition of the trapezoidal correction area.

FIG. 22 illustrates a trapezoidal area that is defined for distortion correction. The book spine is defined with horizontal line CN. If the spine in the original image is not strictly horizontal, the original image is rotated to generate a rotated image shown in FIG. 22. If the spine is strictly horizontal, the rotated image is identical to the original image. The correction area line is defined with left and right points L and R. The page area above line LR is not distorted and need not be corrected. The correction area is represented with trapezoid AKNC.

Intensity correction is defined with two $2^{nd}$ order Bezier curves applied along lines LE and RJ. Squeeze and curvature correction are defined with two $2^{nd}$ order Bezier curves each applied along lines LE and RJ or along other lines parallel to lines LE and RJ. Lines LE, RJ and other lines where the curves are applied may be located outside of the cropping rectangle. The amount of correction at points L and R is zero, as well as at all points on line AK.

G.1 Intensity Correction

In the corrected image the intensity at arbitrary pixel G inside the correction area depends on the intensity of the corresponding pixel in the original image and intensity correction Bezier curves applied along lines LE and RJ. Intensity curves define the amount of intensity correction as a function of a vertical point coordinate in the rotated image.

Let's define a coordinate system of an image (X, Y) with the center in the top left corner and horizontal X axis and vertical Y axis. Let $(x_G, y_G)$ be the coordinates of pixel G in the corrected image. Let $(x'_G, y'_G)$ be the coordinates of the corresponding point G' in the rotated image. When warp correction is not performed, $x'_G = x_G$ and $y'_G = y_G$. Let $(x''_G, y''_G)$ be the coordinates of the corresponding point G'' in the original image. When the original image is not rotated, $x''_G = x'_G$ and $y''_G = y'_G$. We perform the following steps.

Step 1: Intensity correction maps are calculated based on intensity correction Bezier curves for lines LE and RJ. Intensity correction maps contain the amount of intensity correction for every pixel on lines LE and RJ. Alternatively, the amount of intensity correction may be calculated for every other pixel, every third pixel and so on. In the case when intensity correction is combined with warp correction (squeeze and/or curvature correction), the intensity maps are calculated along lines L'E' and R'J' in the rotated image, which correspond to lines LE and RJ in the corrected image.

Step 2: Intensity values of all pixels inside the correction area are calculated as follows. The intensity value of pixel G in the corrected image $I_G$ is calculated as $$I_G = I''_G \frac{I_{BG}}{\Delta I_G},$$

where $I''_G$ is the intensity of the corresponding point G'' in the original image, $I_{BG}$ is background intensity of the page and $\Delta I_G$ is the amount of intensity correction at point G.

Since in the general case coordinates $(x''_G, y''_G)$ of point G'' are fractional values, the value of $I''_G$ is calculated using bi-cubic interpolation between intensity values of 16 neighbor pixels. The amount of intensity correction $\Delta I_G$ is calculated as follows. Line DI is drawn so that $$\frac{|FG|}{|GH|} = \frac{|LD|}{|DE|} = \frac{|RI|}{|IJ|},$$

where point D is located on line LE and point I is located on line RJ (see FIG. 22). For point D two other points are determined on line LE, one point above point D and the other point below point D, where the amount of intensity correction is calculated and stored in the intensity correction map. The amount of intensity correction $\Delta I_D$ at point D is linearly interpolated between the two values from the intensity correction map built for line LE. Similarly, the amount of intensity correction $\Delta I_I$ at point I is linearly interpolated between the two values from the intensity correction map built for line RJ. Finally, the amount of intensity correction $\Delta I_G$ at point G is linearly interpolated between values $\Delta I_D$ and $\Delta I_I$ using one of the following two equations:

$$\Delta I_G = \Delta I_I + (\Delta I_D - \Delta I_I) \frac{|GI|}{|DI|} \text{ or}$$

$$\Delta I_G = \Delta I_D + (\Delta I_I - \Delta I_D) \frac{|DG|}{|DI|}.$$

The former equation is preferable in the left half of the page, while the latter one is preferable in the right half of the page. Since lines LE, FH and RJ are parallel to each other, line segments |DG|, |GI| and |DI| in the two equations above can be replaced with |EH|, |HJ| and |EJ| correspondingly to reduce the amount of calculations.

In the case where intensity correction is combined with warp correction (squeeze and/or curvature correction), points L, F, R, D, G, I, E, H and J should be first mapped to corresponding points L', F', R', D', G', I', E', H' and J' in the rotated image as described in the following section. Then coordinates of the latter points should be used in calculation of $\Delta I_G$.

G.2 Warp Correction

The purpose of warp correction is to map the coordinates of arbitrary pixel G in the corrected image $(x_G, y_G)$ to coordinates of the corresponding point G' in the rotated image $(x'_G, y'_G)$.

The amount of squeeze correction (shift in the direction perpendicular to the book spine, i.e. vertical direction in FIG. 22) for each point inside the correction area AKNC is modeled with two squeeze correction Bezier curves applied along lines LE and RJ. Squeeze correction curves define the amount of vertical shift $\Delta y_G$ as a function of a vertical point coordinate in the rotated image.

The amount of curvature correction (shift in the direction parallel to the book spine, i.e. horizontal direction in FIG. 22) for each point inside the correction area AKNC is modeled with two curvature correction Bezier curves applied along lines LE and RJ. Curvature correction curves define the amount of horizontal shift $\Delta x_G$ as a function of a vertical point coordinate in the rotated image.

The coordinates $(x'_G, y'_G) = (x_G + \Delta x_G, \Delta y_G + \Delta y_G)$ are then used to find the intensity value of pixel G as described in the previous section. We perform the following steps.

Step 1: Squeeze and curvature correction maps are calculated based on squeeze and curvature correction Bezier curves for lines LE and RJ. Squeeze correction maps translate the vertical coordinate (Y) of every pixel on lines LE and RJ in the corrected image to the amount of vertical shift $\Delta y$. Curvature correction maps translate the vertical coordinate (Y) of every pixel on lines LE and RJ in the corrected image to the amount of horizontal shift $\Delta x$. Alternatively, the maps can include shift amount for every other pixel, every third pixel and so on.

Step 2: Coordinates of all pixels inside the correction area are mapped to the rotated image as follows. For each pixel G in the corrected image line DI is drawn so that $$\frac{|FG|}{|GH|} = \frac{|LD|}{|DE|} = \frac{|RI|}{|IJ|},$$

where point D is located on line LE and point I is located on line RJ (see FIG. 22). For point D two other points are determined on line LE, one point above point D and the other point below point D, where the amounts of horizontal shift $\Delta x$ and vertical shift $\Delta y$ are calculated and stored in the curvature and squeeze correction maps. The amount of correction $(\Delta x_D, \Delta y_D)$ at point D is linearly interpolated between values from the squeeze and curvature correction maps built for line LE. Similarly, the amount of correction ($\Delta y_I$, $\Delta y_I$) at point I is linearly interpolated between values from the squeeze and curvature correction maps built for line RJ. Finally, the amount of squeeze correction $\Delta y_G$ at point G is linearly interpolated between values $\Delta y_D$, and $\Delta y_I$ using one of the following two equations:

$$\Delta y_G = \Delta y_I + (\Delta y_D - \Delta y_I)\frac{|GI|}{|DI|} \text{ or}$$

$$\Delta y_G = \Delta y_D + (\Delta y_I - \Delta y_D)\frac{|DG|}{|DI|}.$$

The former equation is preferable in the left half of the page, while the latter one is preferable in the right half of the page. Similarly, the amount of curvature correction $\Delta x_G$ at point G is linearly interpolated between values $\Delta x_D$ and $\Delta x_I$.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method for detecting distortion in an input image of a scanned book, the input image being one of a digitized image stored in a memory or a scanned image from a scanner, comprising:
   using a processor to
      divide the input image into a plurality of blocks of pixels;
      associate each block of pixels in the input image with a pixel in a feature image;
      analyze values of each pixel in the feature image to create a binary map of the feature image, wherein each pixel in the binary map corresponds to a page area or not a page area;
      subject the binary map to object segmentation to group binary map pixels corresponding to a page area;
      create a set of page objects;
      detect borders of the page area; and
      detect distortion within the page area;
   wherein two page objects are created and detecting distortion comprises:
   (a) in the feature image selectin a first column next to a left border the page area and track the values of background components of pixels in the first column from a center of a top page object to a middle of the two page objects;
   (b) checking whether the tracked values have a top-to-bottom decline that is greater than a minimum value, and when the top-to-bottom decline is greater than the minimum value identify the pixel location in the feature image where the to to-bottom decline starts in the first column, and when the top-to-bottom decline is not greater than the minimum value then return to (a) and select another column that is next to the first column; and
   mapping the pixel location in the feature image where the top-to-bottom decline starts in the first column to the input image to identify the coordinate of the top-left corner of a shadow distortion in the input image.

2. A method as in claim 1 wherein detecting distortion further comprises:
   (a) in the feature image, selecting a second column next to a right border of the page area and track the values of background components of pixels in the second column from a center of a top page object to a middle of the two page objects;
   (b) checking whether the tracked values have a top-to-bottom decline that is greater than a minimum value, and when the top-to-bottom decline is greater than the minimum value identify the pixel location in the feature image where the top-to-bottom decline starts in the second column, and when the top-to-bottom decline is not greater than the minimum value then return to (a) and select another column that is next to the second column; and
   mapping the pixel location in the feature image where the top-to-bottom decline starts in the second column to the input image to identify the coordinate of the top-right corner of the shadow distortion in the input image.

3. A method as in claim 2 wherein detecting distortion further comprises:
   (a) in the feature image, selecting a third column next to a left border of the page area and track the values of background components of pixels in the third column from a center of a bottom page object to a middle of the two page objects;
   (b) checking whether the tracked values have a bottom-to-top decline that is greater than the minimum value, and when the bottom-to-top decline is greater than the minimum value identify the pixel location in the feature image where the bottom-to-top decline starts in the third column, and when the bottom-to-top decline is not greater than the minimum value then return to (a) and select another column that is next to the third column; and
   mapping the pixel location in the feature image where the bottom-to-top decline starts in the third column to the input image to identify the coordinate of the bottom-left corner of the shadow distortion in the input image.

4. A method as in claim 3 wherein detecting distortion further comprises:
   (a) in the feature image, selecting a fourth column next to a right border of the page area and track the values of background components of pixels in the fourth column from a center of a bottom page object to a middle of the two page objects;
   (b) checking whether the tracked values have a bottom-to-top decline that is greater than the minimum value, and when the bottom-to-top decline is greater than the minimum value identify the pixel location in the feature image where the bottom-to-top decline starts in the fourth column, and when the bottom-to-top decline is not greater than the minimum value then return to (a) and select another column that is next to the fourth column; and
   mapping the pixel location in the feature image where the bottom-to-top decline starts in the fourth column to the input image to identify the coordinate of the bottom-right corner of the shadow distortion in the input image.

5. A method as in claim 1 wherein detecting distortion further comprises:
   smoothing the values of the background components using a Gaussian filter.

6. A method as in claim 1 further comprising using the processor to detect a book spine region by
   locating a plain background area between two of the page objects; and analyzing the page borders to detect a shape of the borders; and analyzing the shape of the borders to detect the book spine end points.

7. A method as in claim 6 wherein detecting distortion further comprises approximating an intensity change in pixel values in a direction perpendicular to the spine.

8. A method as in claim 7 further comprising fitting intensity values to a Bezier curve to create an intensity curve.

9. A method as in claim 8 further comprising transforming the intensity curve to a squeeze curve.

10. A method for detecting distortion in an input image of a scanned book, the input image being one of a digitized image stored in a memory or a scanned image from a scanner, comprising:

using a processor to
divide the input image into a plurality of blocks of pixels;
associate each block of pixels in the input image with a pixel in a feature image;
analyze values of each pixel in the feature image to create a binary map of the feature image, wherein each pixel in the binary map corresponds to a page area or not a page area;
subject the binary map to object segmentation to group binary map pixels corresponding to a page area;
create a set of page objects;
detect borders of the page area; and
detect distortion within the age area;
wherein detecting distortion comprises detecting curvature by examining text in the page area and fitting points on a string of text segments to a Bezier curve to create a curvature curve.

11. A method as in claim 1 further comprising correcting the detected distortion by defining a trapezoidal correction area.

12. A method as in claim 11 further applying intensity corrections defined with Bezier curves along lines within the trapezoidal correction area.

13. A method as in claim 11 further applying squeeze and curvature corrections defined with Bezier curves along lines within the trapezoidal correction area.

14. A device for detecting distortion in an input image of a scanned book, the input image being one of a digitized image stored in a memory or a scanned image from a scanner, comprising:

an image capture unit that captures the input image;
a memory that stores the input image; and
a processor that
divides the input image into a plurality of blocks of pixels;
associates each block of pixels in the input image with a pixel in a feature image;
analyzes values of each pixel in the feature image to create a binary map of the feature image, wherein each pixel in the binary map corresponds to a page area or not a page area;
subjects the binary map to object segmentation to group binary map pixels corresponding to a page area;
creates a set of page objects;
detects borders of the page area; and
detects distortion within the page area;

wherein the processor creates two page objects and detecting distortion by the processor comprises:
(a) in the feature image, selecting a first column next to a left border of the page area and track the values of background components of pixels in the first column from a center of a top page object to a middle of the two page objects;
(b) checking whether the tracked values have a top-to-bottom decline that is greater than a minimum value, and when the top-to-bottom decline is greater than the minimum value identify the pixel location in the feature image where the top-to-bottom decline starts in the first column, and when the top-to-bottom decline is not greater than the minimum value then return to (a) and select another column that is next to the first column: and
mapping the pixel location in the feature image where the top-to-bottom decline is in the first column to the input image to identify the coordinate of the top-left corner of a shadow distortion in the input image.

15. A device as in claim 14 wherein detecting distortion by the processor further comprises:
(a) in the feature image, selecting a second column next to a right border of the page area and track the values of background components of pixels in the second column from a center of a top page object to a middle of the two page objects;
(b) checking whether the tracked values have a top-to-bottom decline that is greater than a minimum value, and when the top-to-bottom decline is greater than the minimum value identify the pixel location in the feature image where the top-to-bottom decline starts in the second column, and when the top-to-bottom decline is not greater than the minimum value then return to (a) and select another column that is next to the second column; and
mapping the pixel location in the feature image where the top-to-bottom decline starts in the second column to the input image to identify the coordinate of the top-right corner of the shadow distortion in the input image.

16. A device as in claim 15 wherein detecting distortion by the processor further comprises:
(a) in the feature image, selecting a third column next to a left border of the page area and track the values of background components of pixels in the third column from a center of a bottom page object to a middle of the two page objects;
(b) checking whether the tracked values have a bottom-to-top decline that is greater than the minimum value, and when the bottom-to-top decline is greater than the minimum value identify the pixel location in the feature image where the bottom-to-top decline starts in the third column, and when the bottom-to-top decline is not greater than the minimum value then return to (a) and select another column that is next to the third column; and
mapping the pixel location in the feature image where the bottom-to-top decline starts in the third column to the input image to identify the coordinate of the bottom-left corner of the shadow distortion in the input image.

17. A device as in claim 14, wherein the image capture unit is a scanning unit.

* * * * *